(12) United States Patent
King et al.

(10) Patent No.: US 6,722,825 B1
(45) Date of Patent: Apr. 20, 2004

(54) SMALL SIZE GROOVING AND TURNING INSERT

(75) Inventors: Ken King, Fort Wayne, IN (US); Doug DeWitt, Columbia City, IN (US); Jeff Frank, Fort Wayne, IN (US); Eric Bustos, Huntington, IN (US); Dave Coleman, Spencerville, IN (US)

(73) Assignee: Kaiser Tool Company, Inc., Fort Wayne, IN (US)

( * ) Notice: Subject to any disclaimer, the term of this patent is extended or adjusted under 35 U.S.C. 154(b) by 46 days.

(21) Appl. No.: 10/218,920

(22) Filed: Aug. 14, 2002

(51) Int. Cl.[7] .......................... B23P 15/28; B23B 29/00
(52) U.S. Cl. ...................... 407/113; 407/114
(58) Field of Search .................... 407/47, 107, 108, 407/111, 112, 113, 114; 408/231, 713; 30/167, 168; 142/31, 35

(56) References Cited

U.S. PATENT DOCUMENTS

| | | |
|---|---|---|
| 513,954 A | 1/1894 | Owen |
| 1,219,097 A | 3/1917 | Gibbs |
| 1,265,359 A * | 5/1918 | Moore .................. 407/108 |
| 1,313,336 A * | 8/1919 | Saum .................. 407/108 |
| 1,395,262 A | 11/1921 | Curtin |
| 2,480,226 A | 8/1949 | Deibert |
| 2,952,171 A * | 9/1960 | Breuning .................. 408/197 |
| 3,091,474 A * | 5/1963 | Boutros et al. ............... 279/97 |
| 3,149,400 A * | 9/1964 | Breuning .................. 407/111 |
| 3,686,729 A | 8/1972 | Cochran |
| 3,704,497 A | 12/1972 | Derwin |
| 3,754,309 A | 8/1973 | Jones et al. |
| 3,758,927 A | 9/1973 | Stein |
| 3,805,350 A | 4/1974 | Stein |
| 3,981,058 A | 9/1976 | Roos et al. |
| 4,028,782 A | 6/1977 | Stansak |
| 4,669,924 A | 6/1987 | Benson |
| 4,832,541 A | 5/1989 | Noguchi et al. |
| 4,973,204 A | 11/1990 | Mihic |
| 5,076,738 A | 12/1991 | Pano et al. |
| 5,159,863 A * | 11/1992 | Simpson, III ............... 82/1.11 |
| 5,382,119 A | 1/1995 | Mihic |
| 5,638,728 A | 6/1997 | Smith et al. |
| 6,000,885 A | 12/1999 | Erickson |
| 6,033,158 A | 3/2000 | Fountaine |

* cited by examiner

Primary Examiner—A. L. Wellington
Assistant Examiner—Brian D. Walsh
(74) Attorney, Agent, or Firm—Welsh & Katz, Ltd.

(57) ABSTRACT

A small size insert for use with a machine tool for grooving, boring and turning and adapted to be received in a toolholder has an arcuate surface portion and a substantially arcuate-shaped shoulder integral with the body of the insert for accurately positioning the insert within a toolholder.

16 Claims, 3 Drawing Sheets

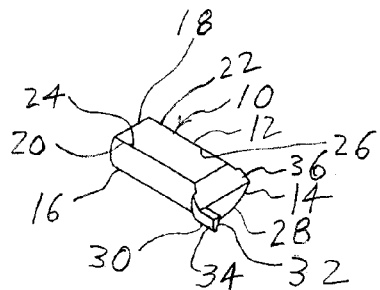
Fig. 3
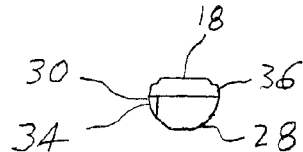
Fig. 6
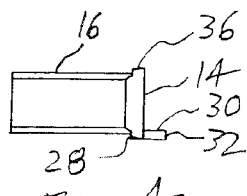
Fig. 4
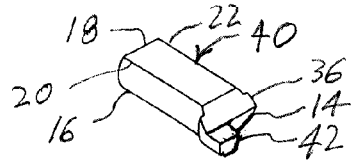
Fig. 7
Fig. 5
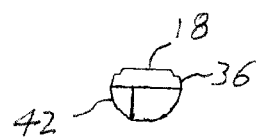
Fig. 9
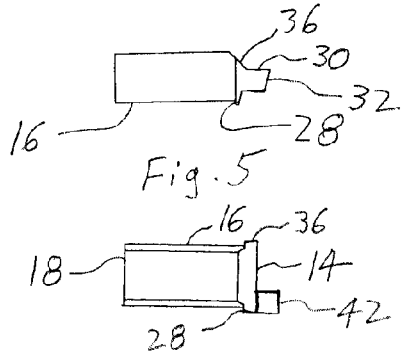
Fig. 8
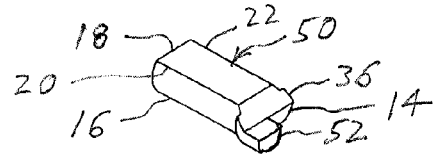
Fig. 10
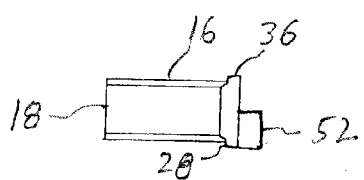
Fig. 11
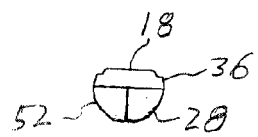
Fig. 12

SMALL SIZE GROOVING AND TURNING INSERT

BACKGROUND OF THE INVENTION

1. Field of the Invention

The present invention relates to cutting tools, namely inserts for machine tools, and more particularly, to small size inserts for grooving and turning.

2. Description of Related Art

The art of cutting grooves in a workpiece using a cutting tool, and particularly using an insert secured in a toolholder is well known. The use of an insert in a toolholder for turning, i.e., removing portions of material from a rotating workpiece by causing the insert to traverse along a portion of the longitudinal surface of the workpiece while the insert is sequentially advanced into the surface of the workpiece, is also known.

In one method of securing the insert during its use, particularly for grooving, cutting or threading, the insert is clamped adjacent one side of a toolholder. In this arrangement the toolholder has a nest or pocket formed by a bottom wall and a side wall, and the insert is held in position by a top clamp. Such an arrangement is illustrated in U.S. Pat. No. 3,754,309, issued to Jones et al. on Aug. 28, 1973.

Turning, for example in a lathe, advantageously is performed by traversing and removing material from the workpiece in both longitudinal directions. However, attempts to use the same insert within a holder for both grooving and turning, especially during turning in both directions, presents problems in securely and accurately maintaining the insert in position during these operations. In particular, during turning, and most especially upon the workpiece being traversed in the direction outwardly from that side of the holder to which the insert is clamped, the outward end of the insert held by a clamp to the toolholder tends to slip or rotate sideways due to the lateral force of the workpiece on the outward end of the insert. This is particularly the case where the bottom insert supporting surface of the holder is planar and perpendicular to the sides as in U.S. Pat. No. 3,754,309. Even where the bottom insert supporting surface of the holder is not planar, but is angled as in U.S. Pat. No. 6,000,885, issued to Erickson on Dec. 14, 1999, the insert tends to slip or rotate from the holder.

Attempts have been made to overcome the tendency of the insert to slip or rotate in the holder due to lateral force on the insert, for example by forming a diagonal notch in the insert and angling the clamp element to engage the notch and by forming recessed angled portions in the top and/or bottom surfaces of the insert, as in U.S. Pat. Nos. 3,754,309 and 6,000,885. However, such attempts have generally been imperfect to counter the force exerted on the insert as explained in U.S. Pat. No. 6,000,885. Furthermore, the attempts to date have not been applicable to small-size inserts. Small-size inserts are inserts having grooving widths in the range of from about 0.004 inch to about 0.125 inch and a body diameter of approximately 0.125 inch. Due to the small size of these inserts, it is impractical to attempt to form diagonal notches and recessed portions in the shank portion of the insert, particularly where the insert is a carbide tool insert.

in another attempt to provide a small-shank tool, and thus one or more small-size inserts, for an automatic lathe or like turning machine, a round or circular cross-sectioned elongated shank was provided to support a pair of rhomboidal-shaped inserts, with fasteners passing through the inserts to hold the inserts to the shank, as in U.S. Pat. No. 6,033,158. However, the support provided for the inserts is limited in size and orientation, i.e., the inserts extend transversely to the axis of the shank, and depend upon fasteners passing through the inserts to resist the forces encountered during cutting, grooving and turning operations. In small-size inserts it is impractical to have an aperture formed therein to receive, if it provided with cause a fastener, a weakened area, particularly if the insert is a carbide tool insert.

In still another attempt to provide inserts and toolholders which can resist the dislodging of the insert from the holder upon encountering cutting, grooving and turning forces, an insert of generally rectangular cross-section is provided with concave upper and lower clamping surfaces which cooperate with concavely-shaped clamping surfaces of a toolholder, as in U.S. Pat. No. 5,076,738. However, the generally rectangular-shaped inserts having arcuate clamping surfaces do not lend themselves for use as small-size inserts in which it would be extremely difficult to form concave upper and lower clamping surfaces, particularly where the insert is a carbide tool insert.

Thus, there exists a need for small-sized inserts which are configured to resist forces exerted on the insert, particularly during turning.

SUMMARY OF THE INVENTION

It is an object of the present invention to provide a small-size insert which is securely held within a holder even when encountering lateral forces which tend to move the insert out of position with respect to the holder.

It is another object of the invention to provide a small-size insert which does not require apertures, recesses, notches or concave surfaces in order to be securely held in position during grooving and turning.

Another object of this invention is to provide an insert with means to easily and accurately position the insert within a toolholder.

It is still another object of this invention to provide a small size insert which can be securely held in position during grooving, cutting, as well as during turning in both directions along the workpiece.

These and other objects and advantages of the present invention will be apparent from the following description.

In accordance with the present invention, a small-size insert is provided for use with a machine tool for grooving, boring and turning. The insert comprises a body, a shoulder integral with the body and extending outwardly from the body, and a cutting portion extending from one end of the body. The body of the insert has a length greater than its width, a first generally arcuate surface portion extending along its length which forms a pair of opposing longitudinal edges, and a second substantially planar portion along the length of the body forming a pair of opposing longitudinal edges, each of which are contiguous with one longitudinal edge of the first generally arcuate portion. The body is adapted to be received within a toolholder having an arcuate insert-receiving portion with the generally arcuate first surface portion of the body residing in the arcuate insert receiving portion of the toolholder. The shoulder integral with the body preferably is arcuate-shaped and extends radially outward from at least a portion of the generally arcuate first portion of the body. The shoulder of the insert permits the insert to be quickly, easily and accurately positioned in a toolholder having an arcuate insert-receiving portion by positioning the shoulder abutting against a finished end portion of the holder. In this manner the shoulder of the insert abutting the end of the toolholder is self orienting with respect to the toolholder, and when clamped to the holder by a clamp exerting clamping force on the substantially planar portion of the body of the insert, the clamping arrangement with the insert provides rigidity to the insert with respect to the toolholder, and affords repeatability in positioning and orientation upon changing inserts with the same toolholder.

BRIEF DESCRIPTION OF THE DRAWING

FIG. 3 is a perspective view of an insert in accordance with one embodiment of the present invention;

FIG. 4 is a top view of the insert of FIG. 3;

FIG. 5 is a left side view of the insert of FIG. 3;

FIG. 6 is a front end view of the insert of FIG. 3;

FIG. 7 is a perspective view of another insert in accordance with the present invention;

FIG. 8 is a top view of the insert of FIG. 7;

FIG. 9 is a front end view of the insert of FIG. 7;

FIG. 10 is a perspective view of still another insert of the present invention;

FIG. 11 is a top view of the insert of FIG. 10;

FIG. 12 is a front end view of the insert illustrated in FIG. 10;

DESCRIPTION OF THE PREFERRED EMBODIMENT

Figure 1:
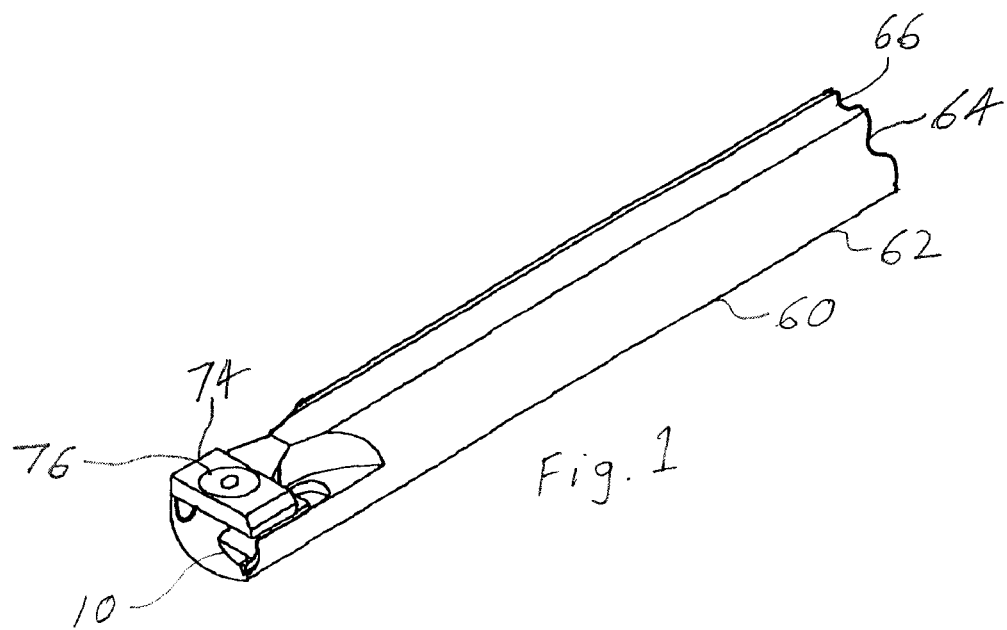
FIG. 1 is a fragmentary perspective view of an insert in accordance with the present invention mounted and clamped to a toolholder and secured thereto.
Figure 2:
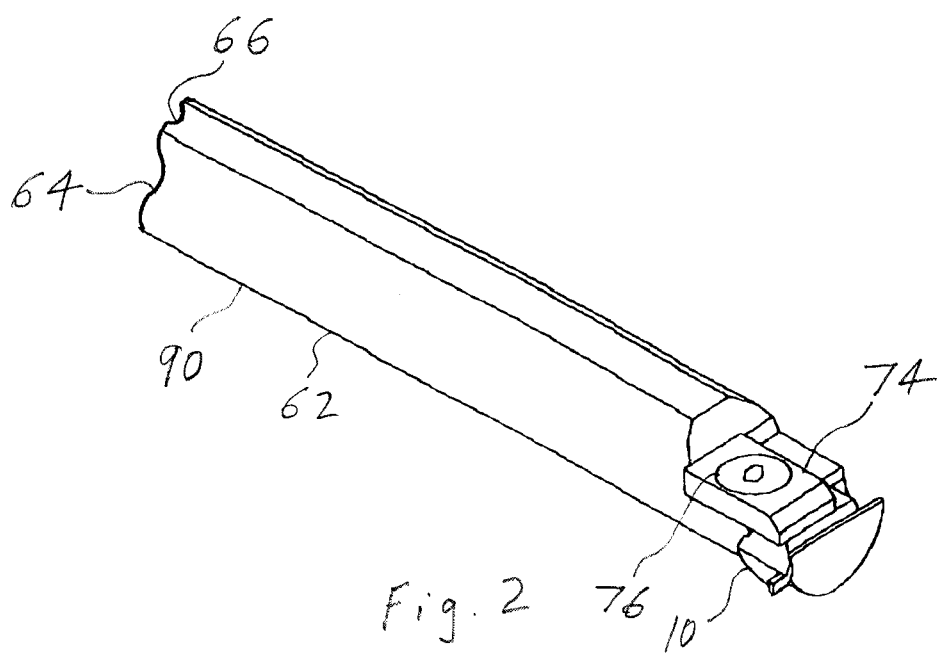
FIG. 2 is another fragmentary perspective view of an insert as in FIG. 1 mounted to another toolholder taken from a different orientation.

In a preferred embodiment of the present invention as illustrated in FIGS. 3–6, and as illustrated in FIGS. 1 and 2 mounted to a toolholder, an insert 10 of this invention is provided having a body 12 which has a length greater than its width, comprised of an end 14, a first generally arcuate surface portion 16, and a second substantially planar portion 18. Generally arcuate surface portion 16 extending along the length of body 12 forms a pair of opposing longitudinal edges 20, 22, and substantially planar portion 18 also extending along the length of body 12 forms a pair of opposing longitudinal edges 24, 26, each of which are contiguous with one of the longitudinal edges 22, 24 of the first generally arcuate surface portion 16. Insert 10 further comprises a substantially arcuate-shaped shoulder 28 which is integral with body 12 and extends outwardly from at least a portion of arcuate first surface portion 16 of body 12. Insert 10 also comprises a cutting portion 30 extending from end 14 and shoulder 28.

In the embodiment shown in FIGS. 3–6, cutting portion 30 is roughly D-shaped in cross-section and has a width at its upper surface of approximately 0.020 inch. As best shown in FIG. 5, the distal end 32 of cutting portion 30 is inclined downwardly and rearwardly to prevent binding in the groove formed in a workpiece during grooving, although other shaped cutting portions can be present as part of the insert as desired. In the embodiment shown, only the upper edges of distal end 32 of cutting portion 30 are utilized in turning.

As best shown in FIGS. 3 and 6, the cutting portion 30 preferably includes an arcuate surface portion 34 and shoulder 28 extends radially outwardly beyond the arcuate surface portion 34. Also preferably, shoulder 28 extends radially outwardly from body 12 adjacent cutting portion 30 substantially along the circumference defined by the first generally arcuate surface portion 16 of body 12. Further, as shown, the body 12 at end 14 includes a downwardly beveled portion 36 extending from substantially planar portion 18 adjacent end 14 at its junction with shoulder 28 to cutting portion 30. Still further, upper surface 38 of cutting portion 30 is substantially planar and extends from beveled portion 36 to the distal end 32 of the cutting portion. As best shown in FIGS. 4 and 6, cutting portion 30 is coextensive at its proximal end integral with body 12 with at least a portion of shoulder 28. Cutting portion 30 therefore is at least slightly offset from body 12 with respect to the longitudinal axis of body 12, as best seen in FIG. 4.

FIGS. 7–9 show an insert 40 in accordance with the present invention, which is identical to insert 10 shown in FIGS. 3–6, except that the cutting portion 42 has a width at its upper surface of approximately 0.040 inch and is roughly D-shaped in cross-section as shown in FIG. 9. In all other respects, insert 40 is identical to insert 10, and the same reference numerals and the description with respect to insert 10 applies to insert 40 and is incorporated herein.

Similarly, FIGS. 10–12 illustrate an insert 50 in accordance with this invention which is identical to inserts 10 and 40, except that the cutting portion 52 has a width at its upper surface of approximately 0.060, and is roughly D-shaped, as shown in FIG. 12. In all other respects, insert 50 is identical to inserts 10 and 40, and the same reference numerals and the same description applies to insert 50 and is incorporated herein.

Figure 13:
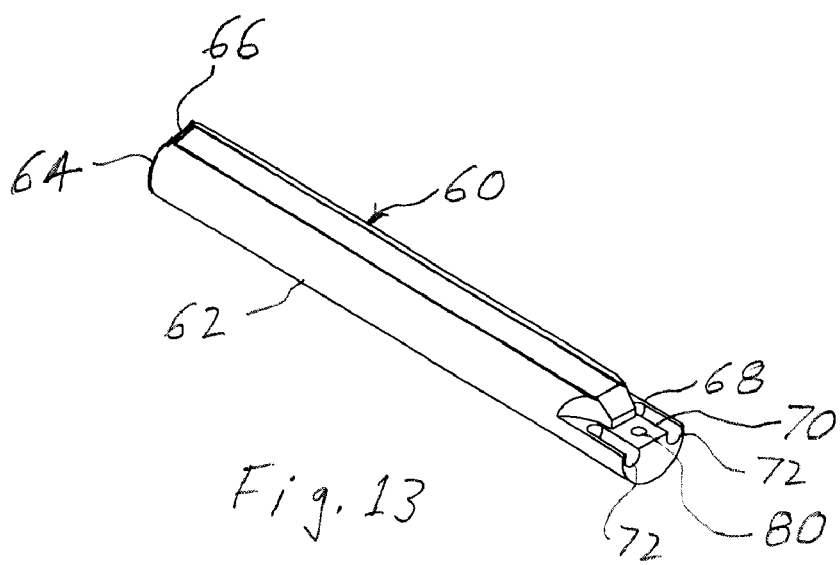
FIG. 13 is a perspective view of the toolholder shown in FIG. 1 with which the insert of the present invention may be utilized.
Figure 14:
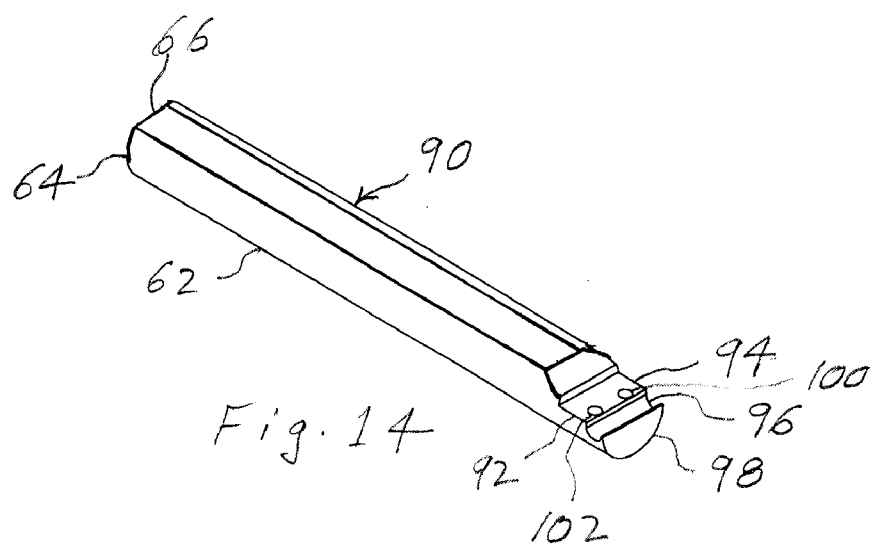
FIG. 14 is a perspective view of the toolholder shown in FIG. 2, with which the insert of the present invention may be used.
Figure 15:
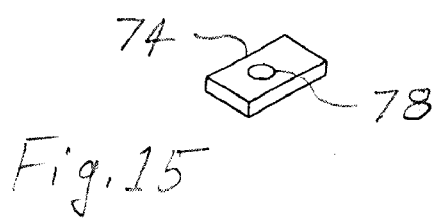
FIG. 15 is a perspective view of the clamp shown in FIGS. 1 and 2, which may be used in cooperation with the insert of the present invention.

Inserts 10, 40 and 50 are intended to be utilized with a toolholder, such as toolholder 60 shown in FIGS. 1 and 13, or toolholder 90 shown in FIGS. 2 and 14. The toolholder 60 has a body 62 having an elongated arcuate portion 64 and an elongated substantially planar portion 66. Distal end portion 68 of body 62 has a planar surface 70 at approximately the horizontal diameter of body 62 and a pair of longitudinal grooves 72 adjacent each side of end portion 68 adapted to receive an insert 10, 40 or 50. Either groove 72 can be used, depending on whether right hand or left hand positioning of the insert is desired. Distal end portion 68 also serves as an abutment against which shoulder 28 of the insert is placed to accurately position the insert in the groove and provide repeatability of accurately positioning replacement inserts. The insert is held in position in one of the grooves 72 by means of a clamp 74 which is secured to end portion 68 by means of a fastener, such as a machine screw 76 passing through an aperture 78 in clamp 74 and into a threaded hole 80 formed in end portion 68. Clamp 74, as it is tightened against planar surface 70 and end portion 68 by machine screw 74 causes the insert to self-orient by rotating its body 12 to cause the substantially planar portion 18 to align horizontally with the bottom surface of the clamp. Inserts 10, 40 50 secured in toolholder 60 are particularly useful for grooving and turning of a workpiece.

The body of toolholder 90 is similarly configured as compared to body 62 of toolholder 60, and the same reference numbers and description as for holder 60 and in FIGS. 1 and 13 are utilized for identical configuration elements for toolholder 90 and in FIGS. 2 and 14. Toolholder 90 differs from toolholder 60 in the configuration of its distal end portion 92. End portion 92 also has a planar surface 94, but a single insert-receiving groove 96 is provided transversely to the axis of body 62 adjacent the distal end 98 of end portion 92. Further, as shown in FIG. 14, two threaded holes 100,102 are provided in planar surface 94 and into end portion 92, the holes 100, 102 being spaced from each other and aligned transversely to the axis of body 62. Clamp 74 is utilized to orient and secure an insert in groove 96, with shoulder 28 of the insert abutting either end of groove 96 depending on whether the cutting portion 30, 42, 52 of the insert is to extend to the right or left from end portion 92. Insert 10, 40, 52 secured in toolholder 90 is particularly useful for internal face boring of a workpiece.

While a particular embodiment of the grooving and turning insert of the invention has been shown and described, it will be appreciated by those skilled in the art that changes and modifications may be made thereto without departing from the invention in its broader aspects and as set forth in the following claims.

What is claimed is:

1. A small-size insert for use with a machine tool for grooving, boring and turning and adapted to be received in a toolholder having an arcuate insert receiving portion, the insert comprising:
   a. a body having a length greater than its width, said body having a first generally arcuate surface portion extending along its length and forming a pair of opposing longitudinal edges, and a second substantially planar portion along the length of the body forming a pair of opposing longitudinal edges, each of which are contiguous with one longitudinal edge of the first generally arcuate portion, said body being adapted to be received within a toolholder having an arcuate insert receiving portion with the generally arcuate first surface portion of the body residing in the arcuate insert receiving portion of the toolholder;
   b. a substantially arcuate-shaped shoulder integral with said body and extending radially outwardly from at least a portion of said generally arcuate first surface portion of said body;
   c. a cutting portion extending from one end of said body and said shoulder portion; and
   d. wherein said cutting portion includes an arcuate surface portion and said shoulder extends radially outwardly beyond said arcuate surface portion of said cutting portion.

2. The insert of claim 1, wherein said substantially arcuate-shaped shoulder extends radially outwardly from said body adjacent said cutting portion substantially along the circumference defined by the first generally arcuate surface portion.

3. The insert of claim 2, wherein said body at said one end includes a downwardly beveled portion extending from the substantially planar surface portion adjacent said one end of the body at its junction with the shoulder cutting portion to said cutting portion.

4. The insert of claim 3, wherein the upper surface portion of said cutting portion is substantially planar and extends from said beveled portion to the outward end of said cutting portion.

5. The insert of claim 1, wherein said cutting portion is coextensive with at least a portion of said shoulder.

6. The insert of claim 5, wherein said body at said one end includes a downwardly beveled portion extending from the planar surface portion adjacent said one end of the body at its junction with the shoulder cutting portion to said cutting portion.

7. The insert of claim 6, wherein the upper surface portion of said cutting portion is substantially planar and extends from said beveled portion to the outward end of said cutting portion.

8. The insert of claim 7, wherein said substantially arcuate-shaped shoulder extends radially outwardly from said body at its junction with said cutting portion substantially along the circumference defined by the first generally arcuate surface portion.

9. A small-size insert for use with a machine tool for grooving, boring and turning and adapted to be received in a toolholder having an arcuate insert receiving portion, the insert comprising:
   a. a body having a length greater than its width, said body having a first, generally arcuate surface portion extending along its length and forming a pair of opposing longitudinal edges, and a second, substantially planar portion along the length of the body forming a pair of opposing longitudinal edges, each of which are contiguous with one longitudinal edge of the first generally arcuate portion, said body being adapted to be received within a toolholder having an arcuate insert receiving portion with the generally arcuate first surface portion of the body residing in the arcuate insert receiving portion of the toolholder;
   b. a substantially arcuate-shaped shoulder integral with said body and extending radially outwardly from at least a portion of said generally arcuate first surface portion of said body;
   c. a cutting portion having a generally D-shaped cross-section including an arcuate surface portion and extending from one end of said body and said shoulder portion; and
   d. said shoulder extending radially outwardly beyond said arcuate surface portion of said cutting portion.

10. The insert of claim 9, wherein said substantially arcuate-shaped shoulder extends radially outwardly from said body adjacent said cutting portion substantially along the circumference defined by the first generally arcuate surface portion.

11. The insert of claim 10, wherein said body at said one end includes a downwardly beveled portion extending from the planar surface portion adjacent said one end of the body at its junction with the shoulder cutting portion to said cutting portion.

12. The insert of claim 11, wherein the upper surface portion of said cutting portion is substantially planar and extends from said beveled portion to the outward end of said cutting portion.

13. A small-size insert for use with a machine tool for grooving, boring and turning and adapted to be received in a toolholder having an arcuate insert receiving portion, the insert comprising:
   a. a body having a length greater than its width, said body having a first generally arcuate surface portion extending along its length and forming a pair of opposing longitudinal edges, and a second substantially planar portion along the length of the body forming a pair of opposing longitudinal edges, each of which are contiguous with one longitudinal edge of the first generally arcuate portion, said body being adapted to be received within a toolholder having an arcuate insert receiving portion with the generally arcuate first surface portion of the body residing in the arcuate insert receiving portion of the toolholder;

b. a substantially arcuate-shaped shoulder integral with said body and extending radially outwardly from at least a portion of said generally arcuate first surface portion of said body;

c. a cutting portion coextensive with at least a portion of said shoulder having a generally D-shaped cross-section including an arcuate surface portion, and extending from one end of said body and said shoulder portion.

14. The insert of claim 13, wherein said body at said one end includes a downwardly beveled portion extending from the planar surface portion adjacent said one end of the body at its junction with the shoulder to said cutting portion.

15. The insert of claim 14, wherein the upper surface portion of said cutting portion is substantially planar and extends from said beveled portion to the outward end of said cutting portion.

16. The insert of claim 15, wherein said substantially arcuate-shaped shoulder extends radially outwardly from said body at its junction with said cutting portion substantially along the circumference defined by the first generally arcuate surface portion.

* * * * *